(12) United States Patent
Moshchuk et al.

(10) Patent No.: US 8,775,006 B2
(45) Date of Patent: Jul. 8, 2014

(54) SYSTEM AND METHOD FOR ENHANCED VEHICLE CONTROL

(75) Inventors: Nikolai K. Moshchuk, Grosse Pointe, MI (US); Shih-Ken Chen, Troy, MI (US); Jin-Woo Lee, Rochester Hills, MI (US); Chad T. Zagorski, Clarkston, MI (US); Aamrapali Chatterjee, Okemos, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/544,689

(22) Filed: Jul. 9, 2012

(65) Prior Publication Data

US 2013/0218396 A1    Aug. 22, 2013

Related U.S. Application Data

(60) Provisional application No. 61/507,862, filed on Jul. 14, 2011.

(51) Int. Cl.
| | |
|---|---|
| *G01C 21/00* | (2006.01) |
| *B60W 50/08* | (2012.01) |
| *B60W 30/09* | (2012.01) |
| *B62D 15/02* | (2006.01) |
| *G08G 1/16* | (2006.01) |

(52) U.S. Cl.
CPC ............... *B60W 50/08* (2013.01); *B60W 30/09* (2013.01); *B62D 15/0265* (2013.01); *G08G 1/16* (2013.01)

USPC ............... 701/25; 701/41; 701/301; 340/436; 340/438; 340/903

(58) Field of Classification Search
CPC .. B60W 50/08; B60W 30/09; B62D 15/0265; G08G 1/16
USPC .......... 701/25, 41, 70, 78, 300, 301; 340/435, 340/436, 438, 901, 903
See application file for complete search history.

(56) References Cited

U.S. PATENT DOCUMENTS 8,457,359 B2 *    6/2013    Strauss et al. ................. 382/104

* cited by examiner

*Primary Examiner* — Gertrude Arthur Jeanglaude
(74) *Attorney, Agent, or Firm* — Mark S. Cohen; Pearl Cohen Zedek Latzer Baratz LLP

(57) ABSTRACT

A method and system may determine, in a vehicle, a desired path around an object based on a location of the object relative to the vehicle, relative speed, road parameters and one or more vehicle parameters. The method and system may calculate one or more vehicle control parameter values which minimize a predicted deviation from the desired vehicle path. The method and system may determine whether the one or more vehicle control parameter values would cause the vehicle to exceed one or more vehicle stability constraints. If the one or more vehicle control parameter values would cause the vehicle to exceed one or more vehicle stability constraints, the one or more vehicle control parameter values may be reduced to one or more vehicle control parameter values not causing the vehicle to exceed the one or more vehicle stability constraints. The method and system may output the one or more vehicle control parameter values to a vehicle automated control device.

17 Claims, 9 Drawing Sheets

SYSTEM AND METHOD FOR ENHANCED VEHICLE CONTROL

CROSS REFERENCE TO RELATED APPLICATIONS

This application claims the benefit of U.S. Provisional Ser. No. 61/507,862, filed on Jul. 14, 2011, which is incorporated in its entirety herein by reference.

BACKGROUND OF THE INVENTION

Many vehicles are equipped with systems and devices to semi-autonomously or autonomously control a vehicle to avoid a collision or mitigate the severity of a collision. Typical collision avoidance control systems may, for example, provide warning to the driver when a collision threat exists, ensure that the vehicle remains stable during an evasive driving maneuver, apply differential braking, and/or perform other functions. Typical collision avoidance control systems, however, do not control the steering of the vehicle to guide the vehicle around an object that may pose a collision threat to the vehicle.

SUMMARY OF THE INVENTION

In some embodiments, a method and system may determine, in a vehicle, a desired path around an object based on a location of the object relative to the vehicle, relative speed, road parameters and one or more vehicle parameters. The method and system may calculate one or more vehicle control parameter values which minimize a predicted deviation from the desired vehicle path. The method and system may determine whether one or more vehicle control parameter values would cause the vehicle to exceed one or more vehicle stability constraints. If the one or more vehicle control parameter values would cause the vehicle to exceed one or more vehicle stability constraints, the one or more vehicle control parameter values may be reduced to one or more vehicle control parameter values not causing the vehicle to exceed the one or more vehicle stability constraints. The method and system may output the one or more vehicle control parameter values to a vehicle automated control device.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
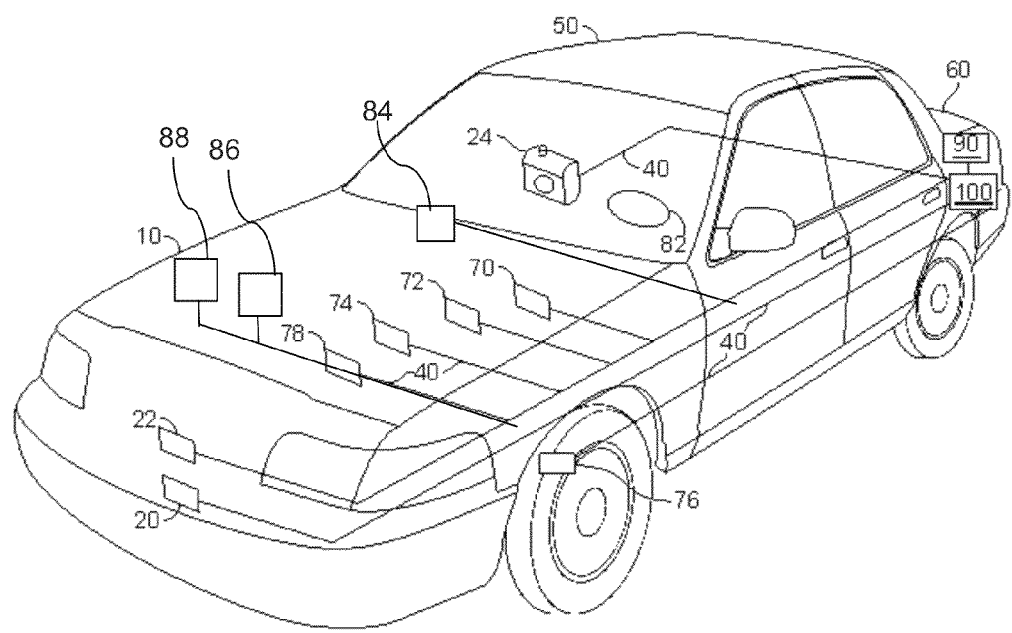
FIG. 1 is a schematic diagram of a vehicle with a collision avoidance control system according to an embodiment of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. It will however be understood by those skilled in the art that the present invention may be practiced without these specific details. In other instances, well-known methods, procedures, and components have not been described in detail so as not to obscure the present invention.

Unless specifically stated otherwise, as apparent from the following discussions, it is appreciated that throughout the specification discussions utilizing terms such as "processing," "computing," "storing," "determining," "evaluating," "calculating," "measuring," "providing," "transferring," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

A collision avoidance control system may be a semi-autonomous driving system that controls the input to for example automated steering, differential braking, automated braking, and/or other systems. The collision avoidance control system may, for example, measure the relative location of objects (e.g., a vehicle, obstacle in the road) with respect to vehicle, e.g., relative to the vehicle (where relative to the vehicle may in some embodiments mean relative to a specific point within a vehicle, relative to a global positioning system (GPS) system within the vehicle, relative to the center of the vehicle, etc.). If the relative distance between the vehicle and an object is within a predefined distance and the relative velocity of vehicle with respect to the object or other reference is within a predefined value and/or range, a collision avoidance control system may determine that the object poses a collision threat to the vehicle. In response, the collision avoidance control system may output a signal to the driver (e.g., an audible warning), output a command to a braking system to reduce the vehicle speed, output a steering angle command to an automated steering system, or perform other actions.

According to some embodiments, if an object that poses a collision threat is detected, the collision avoidance control system may first output a signal to the driver. If the driver does not mitigate the collision threat, the collision avoidance control system may control the vehicle to avoid the collision or mitigate the severity of the collision. The collision avoidance control system may output control commands to an automated braking system, automated steering control system, or other system. For example, if the vehicle is too close to the object to drive around the object, automated braking may be employed to mitigate the impact between vehicle and the object. In some embodiments for some situations, the collision avoidance control system may determine that the vehicle could avoid collision by driving around the object.

According to some embodiments, the collision avoidance control system may calculate a desired path around the object. To guide the vehicle on the desired path, steering angle control, steering torque control, or other commands may be output to an automated steering control system. The steering angle commands or other commands may be calculated using for example a model based predictive control (MPC) system based on a 1-track linear bicycle model or other vehicle dynamics model. Known methods such as those disclosed in U.S. patent application Ser. No. 12/399,317, titled "Model Based Predictive Control for Automated Lane Centering/Changing Control Systems", disclose a system and method for providing steering control for lane changing or lane centering purposes in an autonomous or semi-autonomous vehicle system.

The model based predictive control (MPC) system may be a model that describes vehicle motion with respect to a lane, road, or other feature which the vehicle drives upon.

Using, for example, the MPC or another technique, the collision avoidance control system may determine or calculate actuator commands to drive the vehicle to follow a desired path around the object. The desired path around the object may, for example, follow or lie on a smooth curve (e.g., a second order and/or parabolic curve). The desired path may be calculated based on the curvature of the road, other objects in the road, dimensions of the road (e.g., lane widths, shoulder locations, road width, etc.) and/or other factors.

According to some embodiments, the collision avoidance control system may determine one or more vehicle steering angle control commands, steering torque commands, or other commands to guide the vehicle on the desired path. The collision avoidance control system may, for example, output steering angle control commands, steering torque commands, or other commands to an electrical power steering (EPS), active front steering (AFS), automated steering control system, or other system to guide the vehicle on the path.

The steering angle control commands may, for example, be calculated using an MPC approach with the goal of minimizing deviation from the determined path. The MPC may, for example, use a cost function to calculate steering angle commands. The cost function may, for example, be an integral or summation equation whose solution indicates how much the predicted path of a vehicle over a predetermined time period varies from the desired path of the vehicle. How much the vehicle's predicted path deviates from desired path may be calculated, using the cost function, in terms of heading angle error and lateral offset errors between the vehicle desired path and predicted path. The collision avoidance control system may, for example, calculate steering angle command values that minimize the cost function, and thereby compensate for vehicle lateral position and heading angle error between the determined or desired vehicle path and a predicted vehicle path.

The command steering angle or vehicle control parameter values (or predicted vehicle behavior when following control parameter values) may, in some embodiments, be compared to one or more vehicle stability constraints or parameters to ensure that the vehicle control parameter values will not cause the vehicle to become unstable. The vehicle may become unstable, for example, if the tires lose friction (e.g., begin to slide), lateral acceleration exceeds a threshold value, or other vehicle stability constraints are exceeded. In order to ensure vehicle stability, it may be determined whether the vehicle control parameter values (e.g., steering angle command) exceed one or more vehicle stability constraints (or if the control parameter values would result in the vehicle exceeding vehicle stability constraints). If the vehicle control parameter value(s) exceed one or more vehicle stability constraints (or if the control parameter values would result in the vehicle exceeding vehicle stability constraints), the vehicle control parameter value(s) may be reduced or altered to one or more control parameter values not exceeding the one or more vehicle stability constraints. If, however, the vehicle control parameter value(s) do not exceed one or more vehicle stability constraints, the vehicle control parameter values may not be altered, changed, or reduced. While, typically, when parameters are altered, they are reduced to, for example, reduce the forces acting on the vehicle to improve stability, altering parameters may not require reducing parameters.

The collision avoidance control system may, for example, compare the one or more command steering angles to slip angle constraints, to determine whether the command steering angle, if output to the automated steering control system, will cause the vehicle to become unstable.

According to some embodiments, front and rear tire slip angles may be calculated based on a command steering angle. The calculated front and rear tire slip angles may be used in conjunction with cornering stiffness to calculate front and rear tire steering force constraints. A threshold tire friction force constraint for the front and rear wheels may also be calculated as the product of a dynamic tire friction coefficient and maximal normal force. The steering angle command may, in some embodiments, be compared to front and rear tire steering force constraints and threshold tire friction force constraints. If it is determined that predicted vehicle behavior with the command steering angle exceeds the tire friction force threshold and steering actuator constraint, the vehicle may become unstable or may not be able to avoid a collision. The command steering angle may, therefore, be altered or reduced. If, however, it is determined that the predicted vehicle behavior with the command steering angle does not exceed the tire friction force threshold and steering actuator constraint, the command steering angle may be output to the automated steering control system.

The collision avoidance control system may, for example, compare the one or more command steering angles to lateral acceleration constraints, to determine whether the command steering angle, if output to the automated steering control system, will cause the vehicle to become unstable.

According to some embodiments, the command steering angle may be used to calculate or predict a vehicle lateral acceleration. The calculated or predicted vehicle lateral acceleration based on the command steering angle may be compared to a threshold or maximum lateral acceleration. If the calculated lateral acceleration exceeds the threshold lateral acceleration, the command steering angle may, for example, be altered or reduced. The command steering angle may be reduced to a value such that the lateral acceleration calculated or predicted using the reduced command steering angle equals the threshold lateral acceleration.

According to some embodiments, if one or more command steering angles satisfy the slip angle constraint, lateral acceleration constraint, steering actuator constraint, and/or other constraints, the one or more command steering angles may be output to an automated steering control system to guide the vehicle on the desired path.

FIG. 1 is a schematic diagram of a vehicle with a collision avoidance control system according to an embodiment of the present invention. A vehicle 10 (e.g., a car, truck, or another vehicle) may include a collision avoidance control system 100. Collision avoidance control system 100 may operate in conjunction with or separate from one or more automatic vehicle control systems, autonomous driving applications or vehicle automated steering systems 90. Vehicle automated steering system 90 may, for example, be or include an adaptive lane centering, low speed lane centering, lane keeping assist, or other application. One or more vehicle automated steering system(s) 90 may be component(s) of system 100, or vehicle automated steering system(s) 90 may be separate from system 100. Vehicle automated steering system 90 may, when engaged, fully or partially control the steering of the vehicle and alter or reduce driver (e.g., operator of the vehicle) steering control input via the steering wheel 82 and/or steering system, which may include an electrical power steering (EPS) system and/or other components.

One or more sensor(s) may be attached to or associated with the vehicle 10. A computer vision sensor (e.g., a camera) 24, LIDAR sensor 20 (e.g., laser radar (LADAR) sensor), radar sensor 22, or other remote sensing device may obtain data allowing system 100 to determine or measure the relative location of the vehicle with respect to road features, for example, other vehicles, lane markers(s), road shoulder(s), median barrier(s), edge of the road and other objects or features. Camera 24 may, for example, measure distance and/or relative orientation to objects, other vehicles (e.g., vehicles in front of vehicle 10 that may pose a collision threat), lane offset, heading angle, lane curvature and provide the information to system 90. Collision avoidance control system 100 may control the steering of vehicle 10 in order to avoid an object (e.g., a vehicle) in front of, in the vicinity of, or otherwise near vehicle 10.

In one embodiment of the present invention, vehicle 10 may include one or more devices or sensors to measure vehicle steering measurements, vehicle steering conditions, vehicle steering parameters, vehicle dynamics, driver input, or other vehicle related conditions or measurements. The vehicle dynamics measurement device(s) may include one or more steering angle sensor(s) 70 (e.g., connected to steering wheel 82 and/or another component of the steering system). The vehicle dynamics measurement device(s) may also include one or more accelerometer(s) 72, speedometer(s) 74, wheel speed sensor(s) 76, inertial measurement unit(s) (IMU) 78, gear shift position sensor(s) 84, gas pedal position sensor 86, brake pedal position sensor 88, or other devices. The vehicle dynamics measurement device(s) may measure driver input or vehicle dynamics parameters including steering angle, steering torque, steering direction, lateral (i.e., angular or centripetal) acceleration, longitudinal acceleration, yaw-rate, lateral and longitudinal velocity, speed, wheel rotation, and other vehicle dynamics characteristics of vehicle 10. The measured vehicle dynamics, vehicle conditions, steering measurements, steering conditions, or driver input information may be transferred to system 100 via, for example, a wire link (e.g., a controller area network (CAN) bus, Flexray, Ethernet) 40 or a wireless link. The measured vehicle parameters, vehicle conditions, steering measurements, steering conditions, or driver input information data may be used by system 100 or another system to calculate steering angle, steering torque, and other calculations.

In one embodiment of the present invention, collision avoidance control system 100 may be or may include a computing device mounted on the dashboard of the vehicle, in passenger compartment 50 or in trunk 60. In alternate embodiments, collision avoidance control system 100 may be located in another part of the vehicle, may be located in multiple parts of the vehicle, or may have all or part of its functionality remotely located (e.g., in a remote server or in a portable computing device such as a cellular telephone).

While various sensors and inputs are discussed, in certain embodiments only a subset (e.g. one) type of sensor or input may be used.

Figure 2:
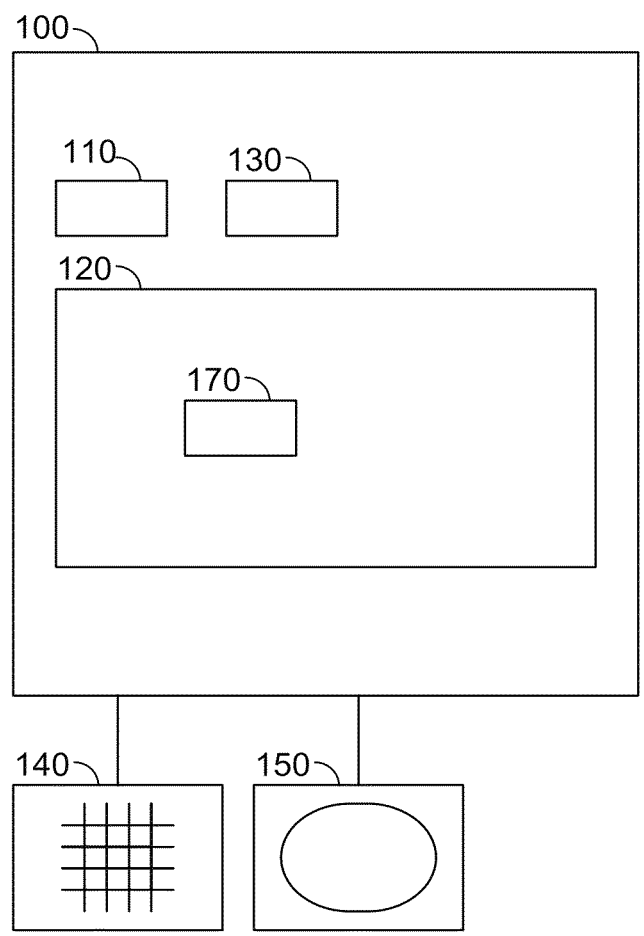
FIG. 2 is a schematic diagram of a collision avoidance control system according to an embodiment of the present invention.

FIG. 2 is a schematic diagram of a collision avoidance control system according to an embodiment of the present invention. Collision avoidance control system 100 may include one or more processor(s) or controller(s) 110, memory 120, long term storage 130, input device(s) or area(s) 140, and output device(s) or area(s) 150. Input device(s) or area(s) 140 may be, for example, a touchscreen, a keyboard, microphone, pointer device, or other device. Output device(s) or area(s) 150 may be, for example, a display, screen, audio device such as speaker or headphones, or other device. Input device(s) or area(s) 140 and output device(s) or area(s) 150 may be combined into, for example, a touch screen display and input which may be part of system 100.

System 100 may include one or more databases 170, which may include, for example, control horizon times, sample times, sample rates, friction force thresholds, cornering stiffness, surface friction coefficients, vehicle parameter values (e.g. vehicle mass (or mass when empty of passengers, etc.), longitudinal distance from center of gravity of vehicle to front and rear axles), and other information. Databases 170 may be stored all or partly in one or both of memory 120, long term storage 130, or another device.

Processor or controller 110 may be, for example, a central processing unit (CPU), a chip or any suitable computing or computational device. Processor or controller 110 may include multiple processors, and may include general-purpose processors and/or dedicated processors such as graphics processing chips. Processor 110 may execute code or instructions, for example, stored in memory 120 or long-term storage 130, to carry out embodiments of the present invention.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include multiple memory units.

Long term storage 130 may be or may include, for example, a hard disk drive, a floppy disk drive, a Compact Disk (CD) drive, a CD-Recordable (CD-R) drive, a universal serial bus (USB) device or other suitable removable and/or fixed storage unit, and may include multiple or a combination of such units.

Figure 3:
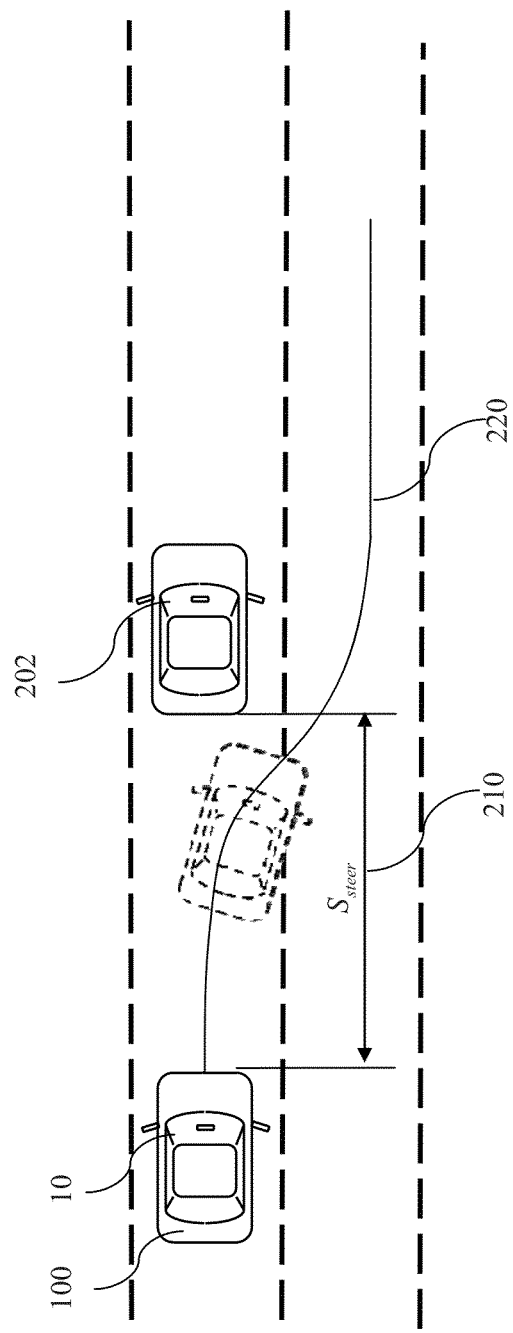
FIG. 3 is a schematic diagram of a collision avoidance control system using steering control according to embodiments of the present invention.

FIG. 3 is a schematic diagram of a collision avoidance control system using steering control according to embodiments of the present invention. Collision avoidance control system 100 may be passive or operate in the background during normal vehicle operation. System 100 may become active when, for example, vehicle sensor data indicates likelihood of imminent collision, a collision threat, or at other times. For example, a vehicle 10 may approach or encounter an object 202 (e.g., a vehicle, stationary object, or other obstacle) in the road. If vehicle is within a predefined distance to the object 202 that poses a collision threat, within a predefined velocity range, and/or within a predefined acceleration range, system 100 or other systems associated with vehicle 10 may, for example, provide pre-collision preparation and/or warnings to the driver of vehicle 10. The warnings to driver of vehicle 10 may be a signal, for example, an audible warning, a warning light or other form of warning. If the driver does not mitigate the collision threat, collision avoidance control system 100 may control vehicle, for example, through automated steering control, automated braking, or other controls or maneuvers in order to avoid obstacle 202 or mitigate the impact between vehicle 10 and object 202. Automated braking may, for example, include common or typical braking (e.g., applying both front brakes, both back brakes, or all brakes simultaneously), differential braking (e.g., applying brakes on each wheel independent of other wheel brakes), and/or another braking system or method. Common braking may, for example, be used to control vehicle in a longitudinal direction. Differential braking may, for example, be used to control vehicle in longitudinal, lateral and other directions.

Which evasive maneuver or actuation system (e.g., automated steering, differential braking, automated braking, or other system) collision avoidance control system 100 employs may be based on for example the velocity of vehicle 10, relative distance between vehicle and object 202, other objects in the road, dimensions of the road, curvature of the road, and other factors. For example, if vehicle 10 is within a predefined steering maneuver threshold distance 210, it may not be possible for vehicle 10 to drive around obstacle 202, and it may be more advantageous to apply automated braking to reduce impact speed between vehicle 10 and object 202.

According to some embodiments, collision avoidance control system 100 may determine that vehicle 10 may avoid collision with object 202 by maneuvering around the object. System 100 may, therefore, calculate a desired path 220 around the object. To guide the vehicle on the desired path 220, steering angle control, steering torque control, or other commands may be output to an automated steering control system. The desired path around the object and steering angle commands or other commands may be calculated using a model based predictive control (MPC) system based on a 1-track linear bicycle model or other vehicle dynamics models. The steering angle commands calculated using the MPC may, in some embodiments, be constrained by or compared to vehicle stability constraints to ensure the vehicle is stable during the steering maneuver.

The collision avoidance control system may determine or calculate a desired path 220 around the object. The desired path 220 around the object may, for example, follow or lie on a smooth curve (e.g., a second order and/or parabolic curve). The desired path may be calculated based on a location, such as a measured or determined relative location of the object (or absolute location), road parameters (e.g., the curvature of the road, other objects in the road, dimensions of the road, lane widths, shoulder locations, road width, etc.), one or more vehicle parameters and/or other factors. Other path calculation or determination methods may be used.

According to some embodiments, using the MPC, the collision avoidance control system 100 may determine one or more vehicle steering angle control commands, steering torque commands, or other control parameter values to guide vehicle on desired path 220. The one or more vehicle control parameters may be calculated to minimize a predicted deviation from the desired vehicle path. The collision avoidance control system may, for example, output steering angle control commands, steering torque commands, or control parameter values to an electrical power steering (EPS), active front steering (AFS), active rear steering (ARS), or other vehicle automated control device to guide vehicle on the path.

The steering angle control commands may, for example, be calculated using an MPC approach with the goal of minimizing deviation from the desired path. The MPC may, for example, calculate one or more steering angle commands by determining one or more steering angle command values, $u_x$, that minimize a cost function such as, for example:

$$J = \int_0^{\Delta T} \left\{ [y \ \varphi]_{err} \cdot Q(x) \cdot \begin{bmatrix} y \\ \varphi \end{bmatrix}_{err} + u_x \cdot R(t) \cdot u_x \right\} dt$$

In the cost function, the cost, J, may indicate how much vehicle 10 is predicted to deviate from desired path over the time period from zero (0) to time, $\Delta T$, (e.g., a time period such as 1 second or another time period). The time period from zero to $\Delta T$ may be the MPC control horizon. The cost, J, may be calculated based on vehicle parameters, road features (e.g., lane curvature), and other parameters. The vehicle parameters may include for example vehicle dynamics parameters, vehicle lateral offset, vehicle heading angle, vehicle lateral velocity, vehicle yaw rate, road wheel angle, longitudinal distance(s) from vehicle center of gravity (CG) to front and rear axles, vehicle track or path, vehicle mass, vehicle yaw inertia, front and rear tire cornering stiffness and other parameters. The lateral offset error, $y_{err}$, may be the difference between the desired lateral offset, $y_{desired}$, and the predicted lateral offset, $y_{predicted}$. The lateral offset may be offset of the vehicle center of gravity (CG) from the lane (e.g., lane markers, center of lane or other lane feature). The heading angle error, $\phi_{err}$, may be the difference between the desired heading angle, $\phi_{desired}$, and the predicted heading angle, $\phi_{predicted}$. The heading angle, $\phi$, may, for example, be the yaw angle of the direction of vehicle travel with respect to the road or another angle. The predicted lateral offset, $y_{predicted}$, and predicted heading angle, $\phi_{predicted}$, may be predicted based on the vehicle dynamics, road features, and other parameters. The predicted lateral offset, $y_{predicted}$, predicted heading angle, $\phi_{predicted}$, and values of the control horizon time period (e.g., the time period from 0 to $\Delta T$) may indicate a path that system 100 predicts the vehicle to follow based on the vehicle parameters, road features, and other factors at time zero.

Q(x) and R(t) may be weighting factors, which may be tuned, for example, through vehicle dynamics simulation or vehicle testing or a combination of both methods. Q(x) may be a weight on control and may represent how quickly the movement from predicted path to desired path should occur. R(t) may be a function that provides a reciprocal weighting factor to the command steering angle, $u_x$, that balances with Q(x). The steering command control value, $u_x$, which results in the lowest value of J or minimizes J in the cost function, may be the steering command value used in slip angle constraint, lateral acceleration constraint, or other vehicle stability constraint calculations.

According to some embodiments, system 100 may determine one or more steering angle command values that minimize the cost function above by calculating a numerical solution for the steering angle command, $u_k$. The numerical solution of the cost function to determine one or more steering angle command values, $u_k$, may be calculated using the following equation:

$$u_k = -\frac{\sum_{j=1}^{p}\left[\sum_{i=1}^{j}(CA^{i-1}B)^T R_{k+j} CA^j\right]}{\sum_{j=1}^{p}\left[\sum_{i=1}^{j}(CA^{i-1}B)^T R_{k+j}(CA^{i-1}B)\right] + Q_k} x_k + \frac{\sum_{j=1}^{p}\left[\sum_{i=1}^{j}(CA^{i-1}B)^T R_{k+j} r_{k+j} - C\sum_{i=1}^{j}A^{i-1}h_k\right]}{\sum_{j=1}^{p}\left[\sum_{i=1}^{j}(CA^{i-1}B)^T R_{k+j}(CA^{i-1}B)\right] + Q_k}$$

The steering angle command, $u_k$, may be the steering angle command value output to an automated steering control system. The number of samples, p, may be the number of time steps calculated with the control horizon time, ΔT. For example, if the control horizon time, ΔT, is 1 second and the sample time, $T_s$, is 0.1 seconds, the number of samples, p, may be 10 or another number of samples. The state vector, $x_k$, may represent the vector consisting of lateral offset, heading angle, lateral velocity, and yaw rate, $r_{k+j}$. The weight on tracking error, $R_{k+j}$, and weight on control, $Q_k$, may be tuned, for example, through vehicle dynamics simulation or vehicle testing. The matrices A, B, and C may include vehicle parameters representing the linear equations of motion of the vehicle. The lane curvature factor, $h_k$, may be based on vehicle parameters and road dimensions. According to some embodiments, lane curvature factor, $h_k$, may be defined for example as follows:

$$h_k = \begin{bmatrix} -\frac{1}{2}V_x^2 T_s^2 \kappa(s) \\ -V_x T_s \kappa(s) \\ 0 \\ 0 \end{bmatrix}$$

The longitudinal velocity, $V_x$, may be the component of the vehicle velocity along the desired path, in a longitudinal direction, or another direction. The lane curvature, κ(s), may, for example, be the inverse of the radius of curvature of the lane, lane center line, lane marker, or other road feature, and, $T_s$, may be the sampling time (for example, 0.1 sec).

The steering angle command values, $u_k$, may, in some embodiments, be compared to one or more vehicle stability constraints or parameters to help ensure that the calculated steering angle will not cause the vehicle to become unstable. The vehicle may become unstable, for example, if the tires lose traction (e.g., tires slip), lateral acceleration exceeds a threshold value, or other vehicle stability constraint thresholds are exceeded.

According to some embodiments, predictive front tire slip angle(s), $\alpha_f$, and rear tire slip angle(s), $\alpha_r$, may be calculated based on a steering angle command, $u_k$. The front tire slip angle(s), $\alpha_f$, may be calculated using for example an equation such as:

$$\alpha_j = H_f A^{j-1} x_k + (H_f A^{j-2} B + \ldots + H_f B) u_k$$

The slip angle(s), $\alpha_f$, may be calculated for the steering command values, $u_k$, calculated at each prediction point (e.g., at points j=1, 2, . . . , p) to ensure vehicle 10 is stable at each prediction point throughout the predicted path of the vehicle. The matrix, $H_f$, may represent the vehicle velocity and vehicle dimensions. The matrix, $H_f$, may, for example, include:

$$H_f = \left[0, 0, -\frac{1}{V_x}, -\frac{a}{V_x}\right]$$

The longitudinal velocity, $V_x$, may be the component of the vehicle velocity along the desired path, in a longitudinal direction. The longitudinal distance, a, may be the longitudinal distance from the vehicle center of gravity to the front vehicle front axle.

According to some embodiments, the predictive rear tire slip angle(s), $\alpha_r$, may be calculated using, for example, an equation such as:

$$\alpha_j = H_r A^{j-1} x_k + (H_r A^{j-2} B + \ldots + H_r B) u_k$$

The matrix, $H_r$, may represent the vehicle velocity and vehicle dimensions. The matrix, $H_r$, may, for example, include:

$$H_r = \left[0, 0, -\frac{1}{V_x}, \frac{b}{V_x}\right]$$

The longitudinal velocity, $V_x$, may be the component of the vehicle velocity along the desired path, in a longitudinal direction. The longitudinal distance, b, may be the longitudinal distance from the vehicle center of gravity to the vehicle rear axle.

The calculated predictive front and rear tire slip angles, $\alpha_f$ and $\alpha_r$, may be used in conjunction with front and rear wheel cornering stiffness, $C_f$ and $C_r$, to calculate front and rear tire steering constraints. A threshold tire friction force for the front and rear wheels may also be calculated as the product of dynamic tire friction, μ, and a maximal normal force, $W_f$. The steering angle command, $u_k$, may be compared to the steering constraint and threshold tire friction force in for example the following inequality:

$$(C_f \alpha_j)^2 + u_k^2 \leq (\mu W_f)^2$$

According to some embodiments, if the steering angle command, $u_k$, satisfies the inequality and does not exceed (or cause the predicted behavior of the vehicle to exceed) the tire stability constraints, the steering angle command may not be altered or reduced and may be output to the automated steering control system or compared to other vehicle stability constraints.

According to some embodiments, if it is determined that the command steering angle, $u_k$, exceeds (or causes the vehicle to exceed) the tire stability constraints (e.g., does not satisfy the inequality), the tires may become unstable. The steering angle command, $u_k$, may, therefore, be altered or reduced to a steering angle command value (e.g., a vehicle control parameter value) not exceeding (or causing the vehicle to exceed) the one or more vehicle stability constraints to ensure the vehicle remains stable. The following formula may, for example, be used to calculate a reduced steering angle command, $u_k$, to ensure vehicle stability:

$$u_k^2 = (\mu W_f)^2 - (C_f \alpha_j)^2$$

The altered or reduced steering angle command value may, for example, be output to the automated steering control system or compared to other vehicle stability constraints.

According to some embodiments, the collision avoidance control system 100 may, for example, compare the one or more command steering angles, $u_k$, to lateral acceleration constraints, to determine whether the command steering angle, if output to the automated steering control system, would cause the vehicle to become unstable.

According to some embodiments, the command steering angle, $u_k$, may be used to calculate a lateral acceleration, $a_{yj}$, according to for example a formula such as:

$$a_{yj} = FA^{j-1}x_k + (FA^{j-2}B + \ldots + FB)u_k$$

Lateral acceleration, $a_{yj}$, may be calculated for the steering command values, $u_k$, calculated at each prediction point (e.g., at points $j=1, 2, \ldots, p$) to ensure vehicle 10 is stable at each prediction point throughout the predicted path of the vehicle. The matrix, F, may represent the vehicle velocity and vehicle dimensions. The matrix, F, may, for example, include:

$$F = [0, 0, a_{11}, a_{12} + V_x]$$

The matrix element, $a_{11}$, may represent the relationship between front and rear cornering stiffness, $C_f$ and $C_r$; vehicle mass, M; and vehicle longitudinal velocity, $V_x$, for example as follows:

$$a_{11} = -\frac{C_f + C_r}{MV_x}$$

The matrix element, $a_{12}$, may represent the relationship between front and rear cornering stiffness, $C_f$ and $C_r$; vehicle mass, M; longitudinal distance from the vehicle CG to front axle, a; longitudinal distance from the vehicle CG to rear axle, b; and vehicle longitudinal velocity, $V_x$, as follows:

$$a_{12} = -V_x - \frac{C_f a - C_r b}{MV_x}$$

According to some embodiments, the calculated lateral acceleration, $a_{yj}$, may, in some embodiments be compared to a threshold lateral acceleration, $a_{y\,max}$, for example as shown in the following inequality:

$$|a_{yj}| \leq a_{y\,max}$$

If the absolute value of the calculated lateral acceleration, $|a_{yj}|$, exceeds the threshold lateral acceleration, $a_{y\,max}$, the steering angle command, $u_k$, may, for example, be altered or reduced. The command steering angle, $u_k$, may be reduced to a value such that the lateral acceleration calculated using the reduced command steering angle equals the threshold lateral acceleration, $a_{y\,max}$. The command steering angle, $u_k$, may be reduced to a steering angle command value (e.g., a vehicle control parameter value) not exceeding (or causing the vehicle to exceed) the one or more vehicle stability constraints (e.g., threshold lateral acceleration) to ensure the vehicle remains stable. The threshold lateral acceleration, $a_{y\,max}$, may be defined by using one or more of the following: vehicle dynamic testing, manufacturing, human factor studies, or other methods. The threshold lateral acceleration, $a_{y\,max}$, may, in some embodiments, be 4.9 meters per second squared (m/s²) (e.g., 0.5 g's), or another value.

According to some embodiments, if the steering angle command, $u_k$, satisfies the inequality and does not exceed (or cause the vehicle to exceed) the vehicle stability constraints, the steering angle command may not be altered or reduced and may be output to the automated steering control system or compared to other vehicle stability constraints According to some embodiments, if one or more steering angle commands, $u_k$, do not exceed (or cause the vehicle to exceed) one or more vehicle stability constraints (e.g., slip angle constraints, lateral acceleration constraints and/or other constraints), the one or more steering angle commands may be output to an automated steering control system to guide the vehicle along a desired path.

While certain formulas are presented herein, other formulas may be used with embodiments of the present invention.

Figure 4:
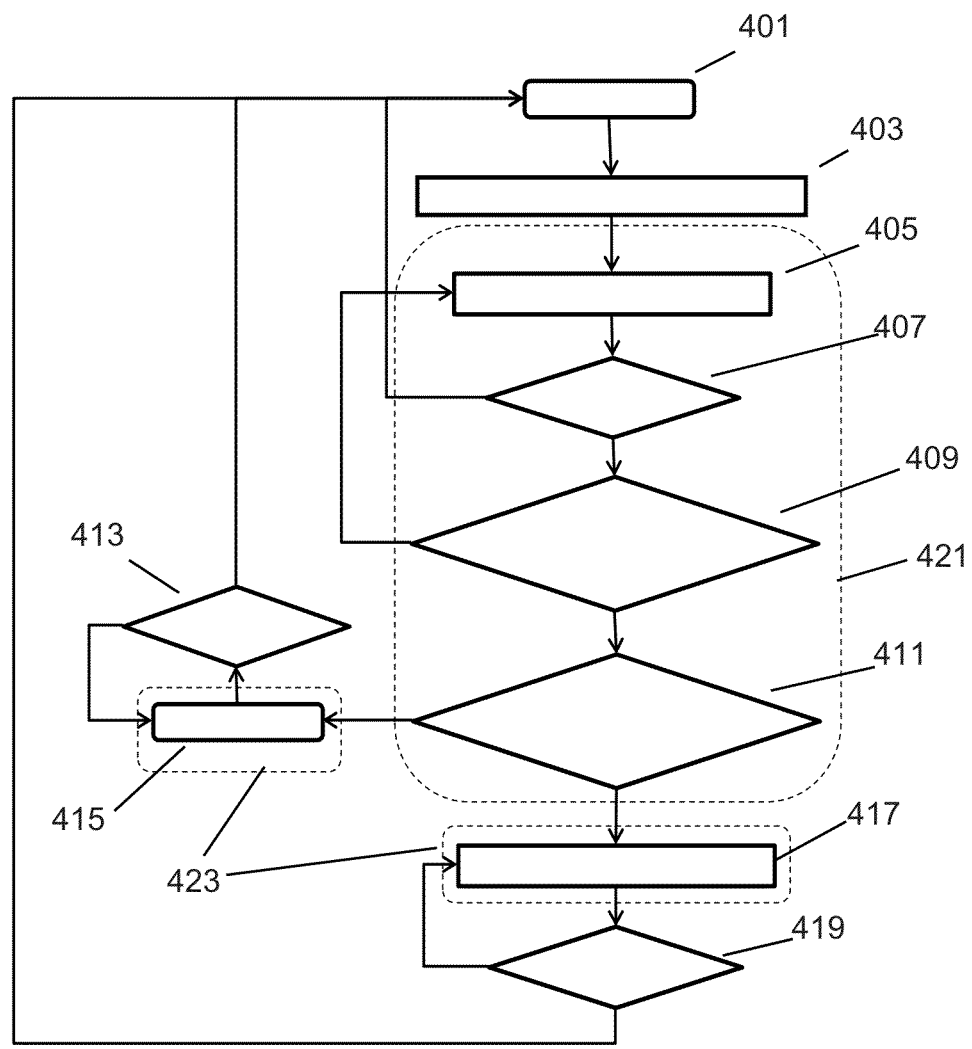
FIG. 4 is a flow chart of the operation of a collision avoidance control system according to embodiments of the present invention.

FIG. 4 is a flow chart of the operation of a collision prevention system according to embodiments of the present invention. Starting from a safe state 401, a collision threat is detected by the sensors in a step 403. In a step 405 the collision avoidance system is activated, and at a decision point 407, if the state is safe, the flow returns to safe state 401. If the state is not safe, flow passes to a decision point 409. At decision point 409, if there is a safe path available to the driver, flow passes to a decision point 411. If there is no safe path available, flow returns to step 405. At decision point 411, if the driver has initiated an action, flow passes to a step 415 where an assisted emergency steering and/or braking maneuver is conducted. From step 415 flow passes to a decision point 413, where the situation is checked for safety. If the situation is safe, flow returns to safe state 401. Otherwise, flow returns to step 415 for continued assisted emergency steering and/or braking maneuvers. At decision point 411, if the driver has not initiated an action, flow passes to a step 417, where an automatic emergency steering and/or braking maneuver is conducted. At a decision point 419, the situation is checked for safety. If the situation is safe, flow returns to safe state 401. Otherwise, flow returns to step 417 for continued automatic emergency steering and/or braking maneuvers. A regime 421 of step 405 through decision point 411 involves only emergency braking, whereas regimes 423 of steps 415 and 417 involve emergency steering and/or emergency braking.

Figure 5:
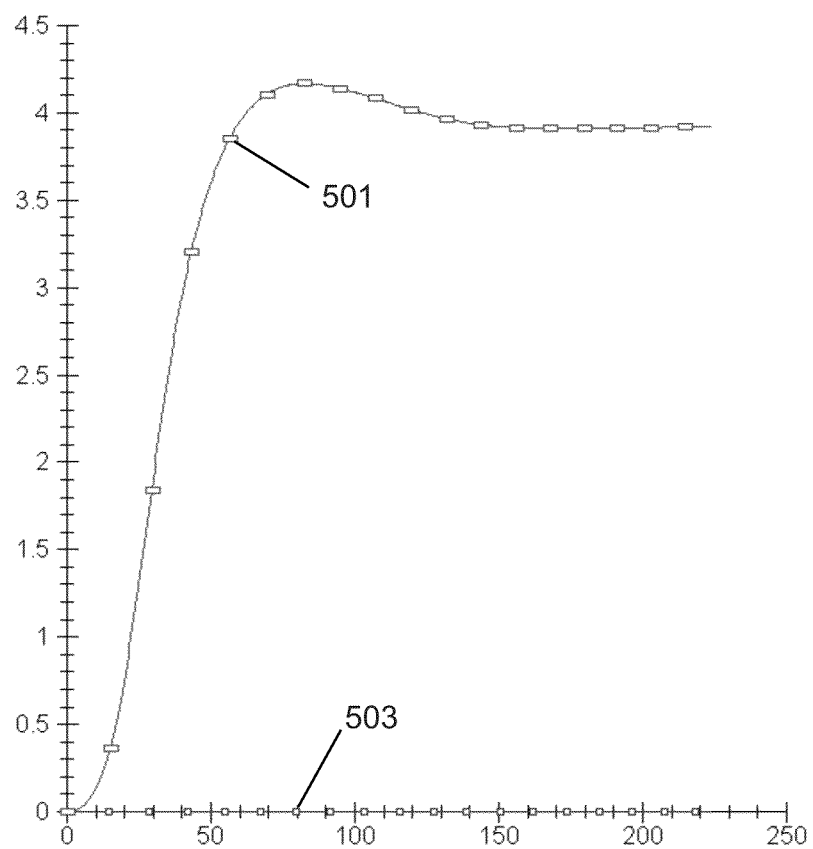
FIG. 5 is a graph of vehicle lateral position versus longitudinal position during a collision avoidance control operation according to embodiments of the present invention.

FIG. 5 is a graph of vehicle lateral position versus longitudinal position during a collision avoidance control operation according to embodiments of the present invention. Vehicle lateral y-position in meters is indicated on the vertical axis, and longitudinal x-position in meters is indicated on the horizontal axis. A vehicle target path 501 and a vehicle design path 503 are plotted.

Figure 6:
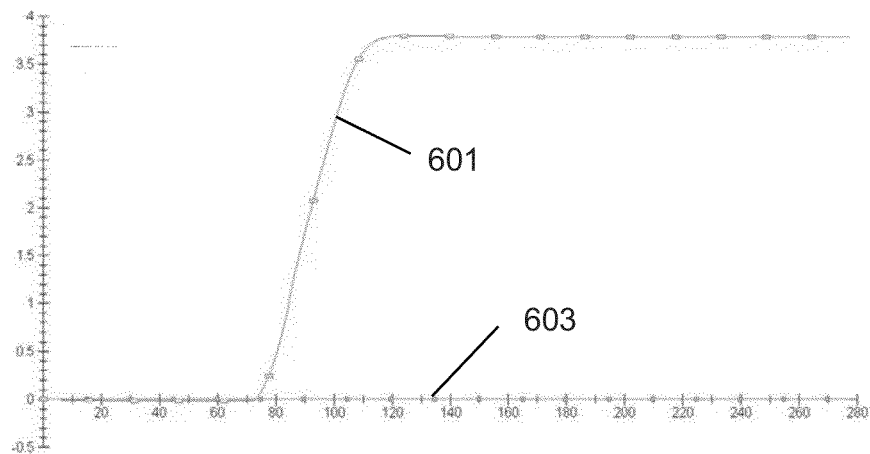
FIG. 6 is a graph of vehicle lateral position versus longitudinal position during offline tuning of a collision avoidance control system according to embodiments of the present invention.

FIG. 6 is a graph of vehicle lateral position versus longitudinal position during offline tuning of a collision avoidance control system according to embodiments of the present invention. Vehicle lateral y-position in meters is indicated on the vertical axis, and longitudinal x-position in meters is indicated on the horizontal axis. A vehicle target path 601 and a vehicle design path 603 are plotted.

Figure 7:
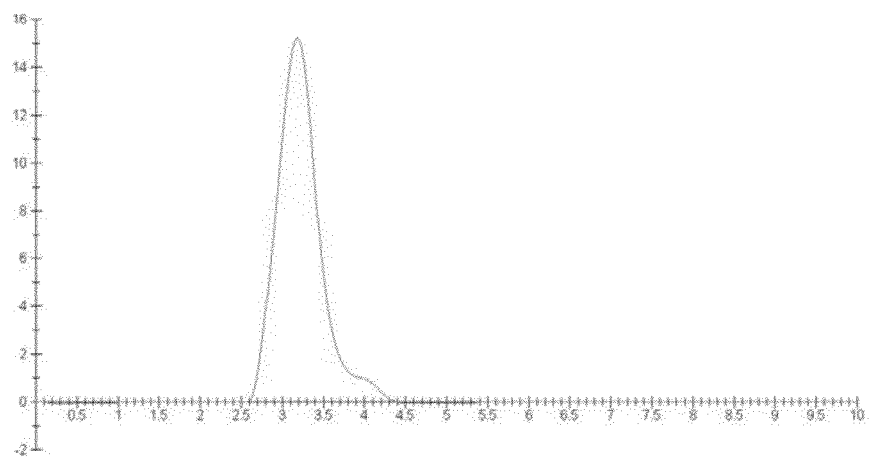
FIG. 7 is a graph of yaw angle versus time during offline tuning of a collision avoidance control system according to embodiments of the present invention.

FIG. 7 is a graph of yaw angle versus time during offline tuning of a collision avoidance control system according to embodiments of the present invention. Vehicle yaw angle in degrees is indicated on the vertical axis, and time in seconds is indicated on the horizontal axis.

Figure 8:
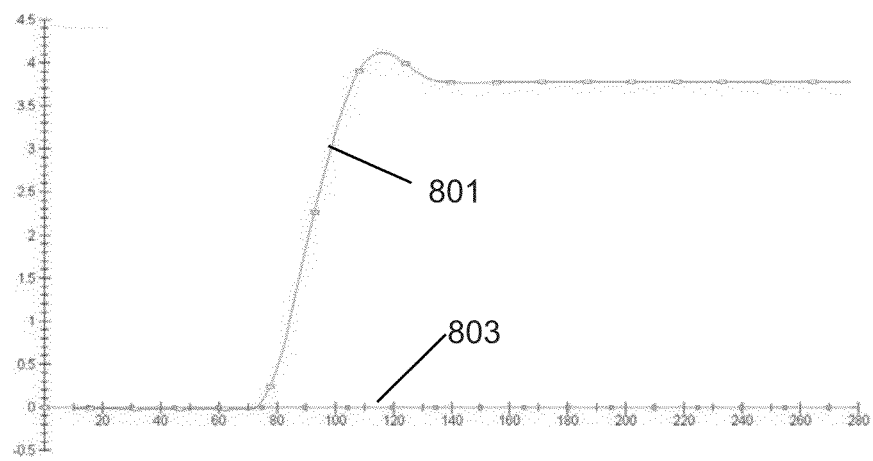
FIG. 8 is a graph of vehicle lateral position versus longitudinal position during offline tuning of a collision avoidance control system according to embodiments of the present invention.

FIG. 8 is a graph of vehicle lateral position versus longitudinal position during offline tuning of a collision avoidance control system according to embodiments of the present invention. In these embodiments tuning is more aggressively applied than in the previously-illustrated tuning. Vehicle lateral y-position in meters is indicated on the vertical axis, and longitudinal x-position in meters is indicated on the horizontal axis. A vehicle target path 801 and a vehicle design path 803 are plotted.

Figure 9:
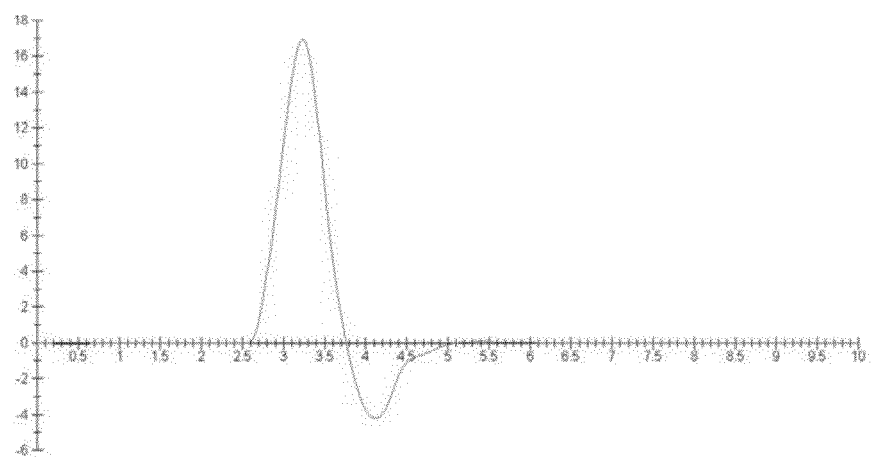
FIG. 9 is a graph of yaw angle versus time during offline tuning of a collision avoidance control system according to embodiments of the present invention.

FIG. 9 is a graph of yaw angle versus time during offline tuning of a collision avoidance control system according to embodiments of the present invention. In these embodiments tuning is more aggressively applied than in the previously-illustrated tuning. Vehicle yaw angle in degrees is indicated on the vertical axis, and time in seconds is indicated on the horizontal axis.

Figure 10:
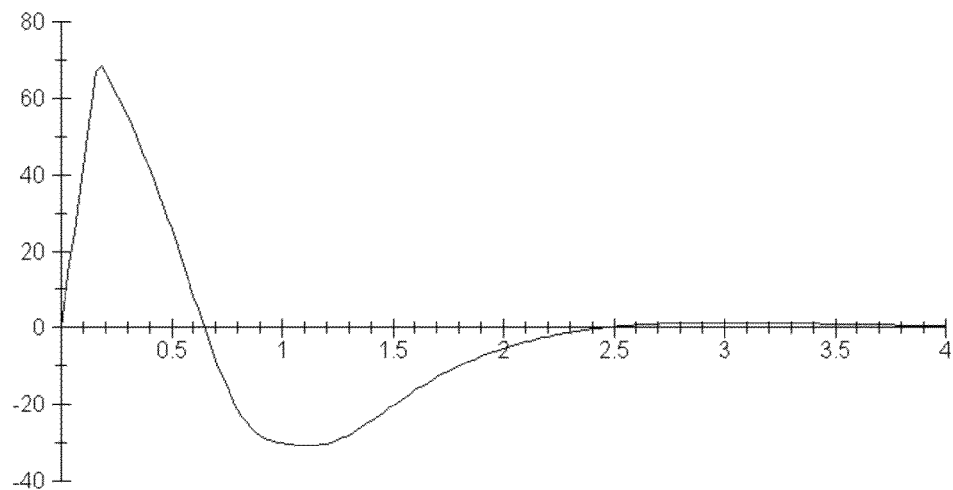
FIG. 10 is a graph of steering angle versus time during a test of a collision avoidance control system according to embodiments of the present invention.

FIG. 10 is a graph of steering angle versus time during a test of a collision avoidance control system according to embodiments of the present invention. For a vehicle speed of 100 kilometers per hour, steering angle in degrees is indicated on the vertical axis, and time in seconds is indicated on the horizontal axis.

Figure 11:
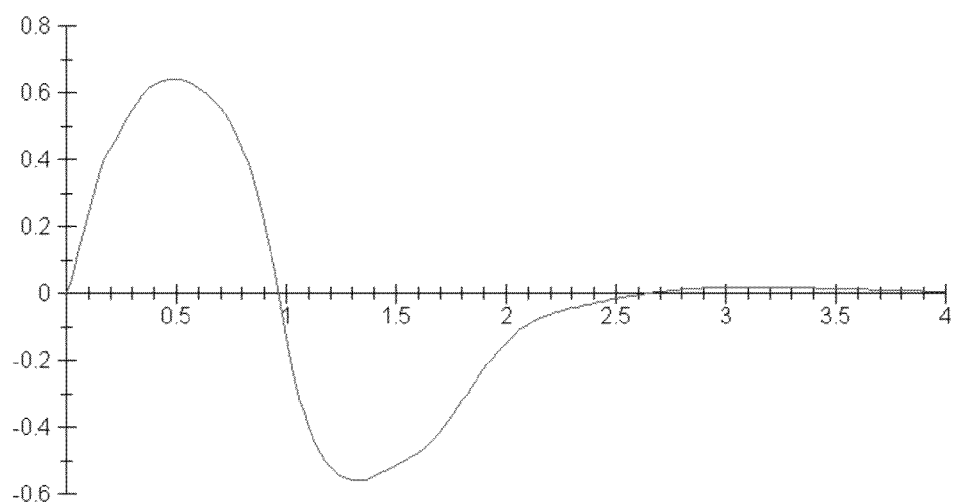
FIG. 11 is a graph of lateral acceleration versus time during a test of a collision avoidance control system according to embodiments of the present invention.

FIG. 11 is a graph of lateral acceleration versus time during a test of a collision avoidance control system according to embodiments of the present invention. For a vehicle speed of 100 kilometers per hour, vehicle lateral acceleration in g is indicated on the vertical axis, and time in seconds is indicated on the horizontal axis.

Figure 12:
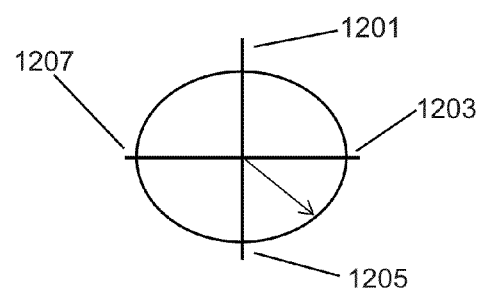
FIG. 12 is a graphical depiction of a tire friction constraint according to embodiments of the present invention.

FIG. 12 is a graphical depiction of a tire friction constraint according to embodiments of the present invention. A positive longitudinal x force axis 1201 represents acceleration, and a negative longitudinal x force axis 1205 represents braking. A positive lateral y force axis 1203 represents cornering right, and a negative lateral y force axis 1207 represents cornering left.

Figure 13:
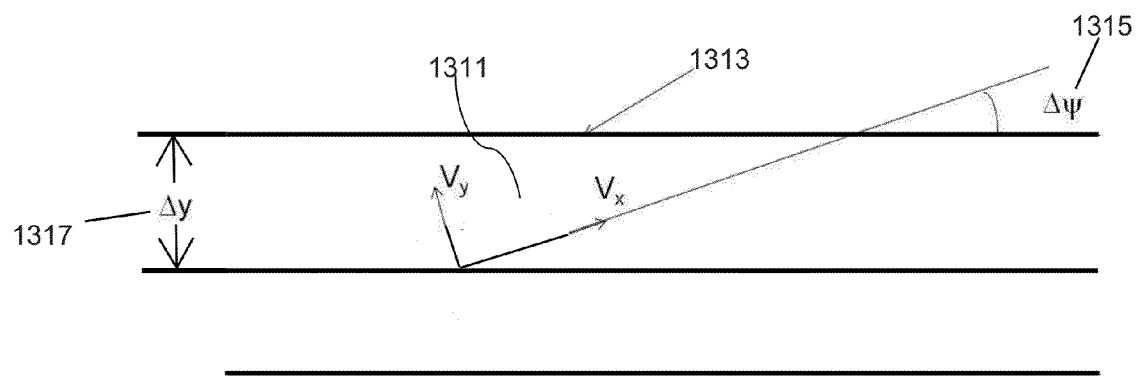
FIG. 13 is a graphical depiction of a vehicle reference frame according to embodiments of the present invention.

FIG. 13 is a graphical depiction of a vehicle reference frame according to embodiments of the present invention. According to embodiments of the present invention, linear equations of motion in vehicle 10 reference frame 1311 may be used to calculate vehicle control parameters, vehicle stability constraints, and other parameters. Vehicle 10 has a position relative to a desired lane center 1313 with a lateral offset $\Delta y$ 1317, a longitudinal velocity $V_x$, a lateral velocity $V_y$, and a heading $\Delta \psi$ 1315.

According to some embodiments, the change in vehicle lateral offset, $\Delta \dot{y}$, may for example be related to vehicle lateral velocity, $V_y$, vehicle longitudinal velocity, $V_x$, and vehicle heading angle error, $\Delta \psi$, by an equation such as:

$$\Delta \dot{y} = V_y + V_x \Delta \psi$$

According to some embodiments, the change in heading angle error, $\Delta \dot{\psi}$, may be related to vehicle yaw rate, r, vehicle longitudinal velocity, $V_x$, and lane curvature, $\rho$, by an equation such as:

$$\Delta \dot{\psi} = r + V_x \rho$$

According to some embodiments, the rate of change of vehicle lateral acceleration, $\dot{V}_y$, may be related to the front wheel cornering stiffness, $C_f$, rear wheel cornering stiffness, $C_r$, vehicle lateral velocity, $V_y$, vehicle mass, M, vehicle longitudinal velocity, $V_x$, longitudinal distance from vehicle CG to front axle, a, longitudinal distance from vehicle CG to rear axle, b, and road wheel angle, $\delta$, by an equation such as the following equation:

$$\dot{V}_y = -\frac{C_f + C_r}{MV_x} V_y - \left(V_x + \frac{C_f a + C_r b}{MV_x}\right) r + \frac{C_f}{M} \delta$$

According to some embodiments, the change in vehicle yaw rate, $\dot{r}$, may be related to the vehicle yaw inertia, $I_z$, and vehicle parameters defined above by an equation such as the following equation:

$$\dot{r} = \frac{C_f a - C_r b}{I_z V_x} V_y - \frac{a^2 C_f + b^2 C_r}{I_z V_x} r + \frac{a C_f}{I_z} \delta$$

According to some embodiments, equations such as the following equations may be used to calculate or determine the matrices, A, B, and C:

$$x_{k+1} = Ax_k + Bu_k + h_k$$

$$y_k = Cx_k$$

According to some embodiments, $x_k$, may, for example, be a state vector and, $y_k$, may be the output vector as defined by equation such as the following equations:

$$x = \begin{bmatrix} \Delta y \\ \Delta \psi \\ V_y \\ r \end{bmatrix}$$

$$y = \begin{bmatrix} \Delta y \\ \Delta \psi \end{bmatrix}$$

While specific operations and values are shown in FIGS. 4-13, other operations and values may be used.

Embodiments of the present invention may include apparatuses for performing the operations described herein. Such apparatuses may be specially constructed for the desired purposes, or may comprise computers or processors selectively activated or reconfigured by a computer program stored in the computers. Such computer programs may be stored in a computer-readable or processor-readable non-transitory storage medium, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions. It will be appreciated that a variety of programming languages may be used to implement the teachings of the invention as described herein. Embodiments of the invention may include an article such as a non-transitory computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. The instructions may cause the processor or controller to execute processes that carry out methods disclosed herein.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

What is claimed is:

1. A method for applying emergency maneuvers to a vehicle to avoid collision, the method comprising:
   detecting, by a sensor, a threat of collision with an object;
   activating a collision avoidance control system;
   detecting, by the collision avoidance control system, whether a driver of the vehicle has initiated an action;
   responsively to detecting that the driver has initiated an action, performing, by the collision avoidance control system, an assisted emergency maneuver, wherein the assisted emergency maneuver assists the driver in avoiding collision with the object;
   responsively to detecting that the driver has not initiated an action, performing, by the collision avoidance control system, an automatic emergency maneuver, wherein the automatic emergency maneuver performs actions to avoid collision with the object;
   determining, in the vehicle, a desired path around the object based on a location of the object relative to the vehicle, a relative speed, a road parameter, and a vehicle control parameter;
   calculating a vehicle control parameter value which minimizes a predicted deviation from a desired vehicle path;
   determining whether the vehicle control parameter value would cause the vehicle to exceed a vehicle stability constraint;
   altering, if the vehicle control parameter value would cause the vehicle to exceed the vehicle stability constraint, the vehicle control parameter value to an alternate vehicle control parameter value, wherein the alternate vehicle control parameter value does not cause the vehicle to exceed the vehicle stability constraint; and
   outputting the alternate vehicle control parameter value to a vehicle automated control device.

2. A method for applying emergency maneuvers to a vehicle to avoid collision, the method comprising:
   detecting, by a sensor, a threat of collision with an object;
   activating a collision avoidance control system;
   detecting, by the collision avoidance control system, whether a driver of the vehicle has initiated an action;
   responsively to detecting that the driver has initiated an action, performing, by the collision avoidance control system, an assisted emergency maneuver, wherein the assisted emergency maneuver assists the driver in avoiding collision with the object;
   responsively to detecting that the driver has not initiated an action, performing, by the collision avoidance control system, an automatic emergency maneuver, wherein the automatic emergency maneuver performs actions to avoid collision with the object;
   determining, in the vehicle, a desired path around the object based on a location of the object relative to the vehicle, a relative speed, a road parameter, and a vehicle control parameter;
   calculating a vehicle control parameter value which minimizes a predicted deviation from a desired vehicle path;
   determining whether the vehicle control parameter value would cause the vehicle to exceed a vehicle stability constraint;
   altering, if the vehicle control parameter value would cause the vehicle to exceed the vehicle stability constraint, the vehicle control parameter value to an alternate vehicle control parameter value, wherein the alternate vehicle control parameter value does not cause the vehicle to exceed the vehicle stability constraint; and
   outputting the alternate vehicle control parameter value to a vehicle automated control device,
   wherein the vehicle control parameter value comprises a steering angle command.

3. A method for applying emergency maneuvers to a vehicle to avoid collision, the method comprising:
   detecting, by a sensor, a threat of collision with an object;
   activating a collision avoidance control system;
   detecting, by the collision avoidance control system, whether a driver of the vehicle has initiated an action;
   responsively to detecting that the driver has initiated an action, performing, by the collision avoidance control system, an assisted emergency maneuver, wherein the assisted emergency maneuver assists the driver in avoiding collision with the object;
   responsively to detecting that the driver has not initiated an action, performing, by the collision avoidance control system, an automatic emergency maneuver, wherein the automatic emergency maneuver performs actions to avoid collision with the object;
   determining, in the vehicle, a desired path around the object based on a location of the object relative to the vehicle, a relative speed, a road parameter, and a vehicle control parameter;
   calculating a vehicle control parameter value which minimizes a predicted deviation from a desired vehicle path;
   determining whether the vehicle control parameter value would cause the vehicle to exceed a vehicle stability constraint;
   altering, if the vehicle control parameter value would cause the vehicle to exceed the vehicle stability constraint, the vehicle control parameter value to an alternate vehicle control parameter value, wherein the alternate vehicle control parameter value does not cause the vehicle to exceed the vehicle stability constraint; and
   outputting the alternate vehicle control parameter value to a vehicle automated control device,
   wherein calculating the vehicle control parameter value which minimize the predicted deviation from the desired vehicle path comprises calculating a steering angle command which minimizes a cost function.

4. A method for applying emergency maneuvers to a vehicle to avoid collision, the method comprising:
   detecting, by a sensor, a threat of collision with an object;
   activating a collision avoidance control system;
   detecting, by the collision avoidance control system, whether a driver of the vehicle has initiated an action;
   responsively to detecting that the driver has initiated an action, performing, by the collision avoidance control system, an assisted emergency maneuver, wherein the assisted emergency maneuver assists the driver in avoiding collision with the object;

responsively to detecting that the driver has not initiated an action, performing, by the collision avoidance control system, an automatic emergency maneuver, wherein the automatic emergency maneuver performs actions to avoid collision with the object;

determining, in the vehicle, a desired path around the object based on a location of the object relative to the vehicle, a relative speed, a road parameter, and a vehicle control parameter;

calculating a vehicle control parameter value which minimizes a predicted deviation from a desired vehicle path;

determining whether the vehicle control parameter value would cause the vehicle to exceed a vehicle stability constraint;

altering, if the vehicle control parameter value would cause the vehicle to exceed the vehicle stability constraint, the vehicle control parameter value to an alternate vehicle control parameter value, wherein the alternate vehicle control parameter value does not cause the vehicle to exceed the vehicle stability constraint; and outputting the alternate vehicle control parameter value to a vehicle automated control device, wherein the vehicle stability constraint comprises a lateral acceleration constraint.

5. A method for applying emergency maneuvers to a vehicle to avoid collision, the method comprising:

detecting, by a sensor, a threat of collision with an object;
activating a collision avoidance control system;
detecting, by the collision avoidance control system, whether a driver of the vehicle has initiated an action;
responsively to detecting that the driver has initiated an action, performing, by the collision avoidance control system, an assisted emergency maneuver, wherein the assisted emergency maneuver assists the driver in avoiding collision with the object;

responsively to detecting that the driver has not initiated an action, performing, by the collision avoidance control system, an automatic emergency maneuver, wherein the automatic emergency maneuver performs actions to avoid collision with the object;

determining, in the vehicle, a desired path around the object based on a location of the object relative to the vehicle, a relative speed, a road parameter, and a vehicle control parameter;

calculating a vehicle control parameter value which minimizes a predicted deviation from a desired vehicle path;

determining whether the vehicle control parameter value would cause the vehicle to exceed a vehicle stability constraint;

altering, if the vehicle control parameter value would cause the vehicle to exceed the vehicle stability constraint, the vehicle control parameter value to an alternate vehicle control parameter value, wherein the alternate vehicle control parameter value does not cause the vehicle to exceed the vehicle stability constraint; and outputting the alternate vehicle control parameter value to a vehicle automated control device, wherein the vehicle stability constraint comprises a slip angle constraint.

6. A method for applying emergency maneuvers to a vehicle to avoid collision, the method comprising:

detecting, by a sensor, a threat of collision with an object;
activating a collision avoidance control system;
detecting, by the collision avoidance control system, whether a driver of the vehicle has initiated an action;
responsively to detecting that the driver has initiated an action, performing, by the collision avoidance control system, an assisted emergency maneuver, wherein the assisted emergency maneuver assists the driver in avoiding collision with the object;

responsively to detecting that the driver has not initiated an action, performing, by the collision avoidance control system, an automatic emergency maneuver, wherein the automatic emergency maneuver performs actions to avoid collision with the object;

determining, in the vehicle, a desired path around the object based on a location of the object relative to the vehicle, a relative speed, a road parameter, and a vehicle control parameter;

calculating a vehicle control parameter value which minimizes a predicted deviation from a desired vehicle path;

determining whether the vehicle control parameter value would cause the vehicle to exceed a vehicle stability constraint;

altering, if the vehicle control parameter value would cause the vehicle to exceed the vehicle stability constraint, the vehicle control parameter value to an alternate vehicle control parameter value, wherein the alternate vehicle control parameter value does not cause the vehicle to exceed the vehicle stability constraint; and outputting the alternate vehicle control parameter value to a vehicle automated control device, wherein the vehicle stability constraint comprises a slip angle constraint, wherein the vehicle stability constraint comprises a lateral acceleration constraint.

7. A method for controlling a vehicle to avoid collision with an object, the method comprising:

determining, in the vehicle, a desired path around the object based on a location of the object relative to the vehicle, a relative speed, a road parameter, and a vehicle parameter;

calculating a vehicle control parameter value which minimizes a predicted deviation from a desired vehicle path;

determining whether the vehicle control parameter value would cause the vehicle to exceed a vehicle stability constraint;

altering, if the vehicle control parameter value would cause the vehicle to exceed the vehicle stability constraint, the vehicle control parameter value to an alternate vehicle control parameter value, wherein the alternate vehicle control parameter value does not cause the vehicle to exceed the vehicle stability constraint; and outputting the alternate vehicle control parameter value to a vehicle automated control device.

8. The method of claim 7, wherein the vehicle control parameter value comprises a steering angle command.

9. The method of claim 7, wherein calculating the vehicle control parameter value which minimize the predicted deviation from the desired vehicle path comprises calculating a steering angle command which minimizes a cost function.

10. The method of claim 7, wherein the vehicle stability constraint comprises a lateral acceleration constraint.

11. The method of claim 7, wherein the vehicle stability constraint comprises a slip angle constraint.

12. The method of claim 11, wherein the vehicle stability constraint comprises a lateral acceleration constraint.

13. A collision avoidance control system for a vehicle to avoid collision with an object, the collision avoidance control system comprising a processor, a memory, a storage, an input device, and an output device, and wherein the collision avoidance control system is configured:

to determine, in the vehicle, a desired path around the object based on a location of the object relative to the vehicle, a relative speed, a road parameter, and a vehicle control parameter;

to calculate a vehicle control parameter value which minimizes a predicted deviation from a desired vehicle path;

to determine whether the vehicle control parameter value would cause the vehicle to exceed a vehicle stability constraint;

to alter, if the vehicle control parameter value would cause the vehicle to exceed the vehicle stability constraint, the vehicle control parameter value to an alternate vehicle control parameter value, wherein the alternate vehicle control parameter value does not cause the vehicle to exceed the vehicle stability constraint; and to output the alternate vehicle control parameter value to a vehicle automated control device.

14. The collision avoidance control system of claim 13, wherein the vehicle control parameter value comprises a steering angle command.

15. The collision avoidance control system of claim 13, wherein to calculate the vehicle control parameter value which minimize the predicted deviation from the desired vehicle path comprises a calculation of a steering angle command which minimizes a cost function.

16. The collision avoidance control system of claim 13, wherein the vehicle stability constraint comprises a lateral acceleration constraint.

17. The collision avoidance control system of claim 13, wherein the vehicle stability constraint comprises a slip angle constraint.

* * * * *